United States Patent
Warwick

[19]

[11] Patent Number: 6,000,506
[45] Date of Patent: Dec. 14, 1999

[54] DISC BRAKE CALIPER

[75] Inventor: Edward Harry Warwick, Englewood, Ohio

[73] Assignee: General Motors Corporation, Detroit, Mich.

[21] Appl. No.: 09/027,587

[22] Filed: Feb. 23, 1998

[51] Int. Cl.[6] .................................................. F16D 55/224
[52] U.S. Cl. ............................... 188/73.31; 188/1.11 W; 188/72.5; 188/370; 188/71.1
[58] Field of Search .................................. 188/73.46, 370, 188/72.5, 73.31, 71.1, 1.11 W, 1.11 R, 73.39, 72.4, 205 R, 206 R, 73.47, 344, 369; 340/454; 166/208

[56] References Cited

U.S. PATENT DOCUMENTS

| | | | |
|---|---|---|---|
| 3,384,203 | 5/1968 | Walther et al. . | |
| 3,556,265 | 1/1971 | Shakespear | 188/73.31 |
| 4,090,590 | 5/1978 | Karasudani et al. | 188/72.5 |
| 4,093,043 | 6/1978 | Smith | 188/72.5 |
| 4,460,067 | 7/1984 | Katagiri et al. | 188/1.11 W |
| 4,494,630 | 1/1985 | Stoke et al. | 188/370 |
| 4,498,559 | 2/1985 | Katagiri et al. | 116/208 |
| 4,505,363 | 3/1985 | Herbulot et al. | 188/72.5 |
| 4,745,992 | 5/1988 | Lusc | 188/1.11 W |
| 4,867,280 | 9/1989 | Von Gruenberg et al. | 188/72.4 |
| 4,872,535 | 10/1989 | Dayen et al. | 188/73.46 |
| 5,022,500 | 6/1991 | Wang | 188/73.31 |
| 5,033,590 | 7/1991 | Kobayashi et al. | 188/1.11 W |
| 5,117,947 | 6/1992 | Kobayashi et al. | 188/1.11 W |
| 5,277,279 | 1/1994 | Shimura | 188/72.5 |
| 5,472,068 | 12/1995 | Weiler et al. | 188/71.1 |
| 5,515,948 | 5/1996 | Gilliland | 188/72.5 |
| 5,727,659 | 3/1998 | Brown et al. | 188/73.31 |
| 5,819,886 | 10/1998 | Null | 188/72.5 |
| 5,893,434 | 4/1999 | Walker et al. | 188/1.11 W |

OTHER PUBLICATIONS

Baker, "Vehicle Braking," Pentech Press, 1986, pp. 115–116.
Anonymous Research Disclosure, Jan. 1998, p. 15, "Disc Brake Lining Wear Sensor".

*Primary Examiner*—Douglas C. Butler
*Attorney, Agent, or Firm*—Jeffrey A. Sedlar; Robert M. Sigler

[57] ABSTRACT

A single-piece housing fixed brake caliper is provided with one relatively large piston bore on one side of the rotor and two relatively smaller piston bores on the opposing side of the rotor. The sum of the areas of the two relatively smaller pistons is equal to the area of the one relatively larger piston to provide balanced braking. The side of the caliper housing opposite the two relatively smaller bores contains two access cavities that provide clearance for the tooling that is necessarily positioned within the caliper to machine the bores. Similarly, the side of the caliper housing opposite the one relatively larger bore contains one access cavity that provides clearance for the tooling.

6 Claims, 4 Drawing Sheets

DISC BRAKE CALIPER

TECHNICAL FIELD

This invention relates to disc brake calipers and more particularly, to a fixed (non-sliding), disc brake caliper assembly of the opposed piston type.

BACKGROUND OF THE INVENTION

Disc brake calipers are widely used in vehicle braking systems. Calipers are categorized into at least two main types including fixed calipers and sliding calipers. A fixed caliper's housing is generally mounted to the vehicle's steering knuckle or bearing housing by a rigid connection. A sliding caliper's housing is generally mounted to the vehicle's steering knuckle or bearing housing on a guide pin system and through a mounting bracket. By allowing a caliper to slide, forces on each side of the rotor are balanced, even when a piston is only provided on one side of the rotor. With a fixed housing caliper, pistons are provided on opposed sides of the rotor and forces are balanced hydraulically. A fixed caliper may be preferable in many applications since the balancing of forces is achieved in a closed environment that is not subjected to friction causing contaminates.

One way of providing a fixed caliper design, is to use a "one-piece" housing with a plug in the piston bore(s) of one side of the caliper to allow access to machine the bores on the opposite side of the caliper during manufacturing. A drawback of the plug design is that a true one-piece caliper housing is not achieved since the plug itself is a separate piece that requires additional processing and sealing features. An alternative way of making a fixed caliper is to use a two piece design where the caliper housing is split along the longitudinal direction of the vehicle (substantially in the rotational plane of the rotor), so that the two halves can be machined before assembly. This alternative type of caliper also requires additional processing and sealing features.

Even though brake calipers have been in widespread use for many years, a true one piece housing fixed caliper that uses fewer parts and processing steps still remains elusive. Accordingly, a need continues to exist.

SUMMARY OF THE INVENTION

This invention addresses the need for a true one-piece housing fixed brake caliper. According to an aspect of the invention, a single piece housing is provided with one relatively large piston bore on one side of the rotor and two relatively smaller piston bores on the opposing side of the rotor. The sum of the areas of the two relatively smaller pistons is equal to the area of the one relatively larger piston to provide balanced braking. The side of the caliper housing opposite the two relatively smaller bores contains two access cavities that provide clearance openings for the tooling that is necessarily positioned within the caliper to machine the bores during manufacturing. Similarly, the side of the caliper housing opposite the one relatively larger bore contains one access cavity that provides a clearance opening for the tooling. According to a preferred and optional aspect of the present invention, the tooling used to machine the two relatively smaller bores is also used to machine pockets in the inboard and the outboard sections of the caliper housing for retaining the shoe assemblies.

An advantage of the present invention resides in reducing processing and component cost. Unexpectedly, the invention can also result in better vehicle operational efficiency. This is because the caliper can be designed to provide reduced drag on the rotor by increasing the amount the pistons are retracted during brake release. Since the caliper is one-piece it generally has greater strength than a two-piece design of similar dimensions that is connected only at discrete joints. The one-piece design provides a continuous connection over the outside diameter of the rotor. This results in less deflection, which translates into less displacement, and therefore, less fluid movement is required to apply force between the pads and the rotor. Because the caliper deflects less, the pistons can be designed with increased retraction.

BRIEF DESCRIPTION OF THE DRAWINGS

The present invention will now be described by way of example, with reference to the accompanying drawings, in which.

DESCRIPTION OF THE PREFERRED EMBODIMENT

Figure 1:
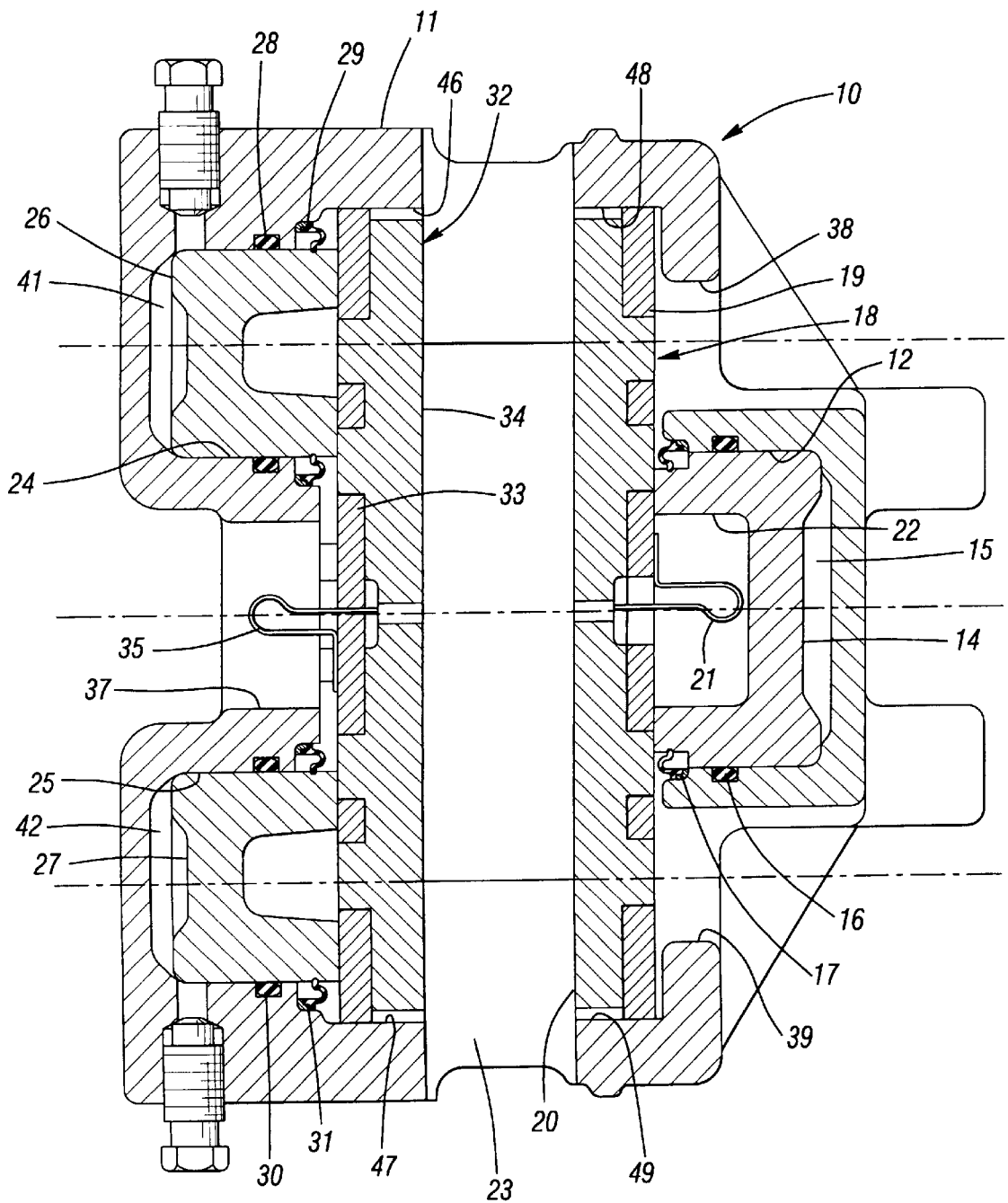
FIG. 1 is a fragmentary cross sectional illustration of a brake caliper assembly.

Referring to the drawings, FIG. 1 shows a disc brake caliper assembly 10 that includes a one-piece housing 11. The one-piece housing 11 defines an inboard bore 12 that slidably carries a piston 14 so as to define a fluid chamber 15 within the bore 12. A fluid seal 16 is disposed in an annular groove defined in the housing 11 within the bore 12 and engages the piston 14 to maintain fluid in the chamber 15. A resilient wiper 17 is also carried by the housing 11 at the opening to the bore 12. The wiper 17 is annular in shape and engages the piston 14. Housing 11 carries inboard pad assembly 18 which is engaged by the piston 14 and includes a plate 19 with a lining 20 bonded thereto. A wear sensor 21 is connected to the plate 19 and extends into the lining 20. The sensor comprises a metal reed that contacts the brake rotor when the lining has worn to a certain point causing vibrations and audible sounds that are indicative of a need to change the pad assembly 18. The wear sensor 21 includes a bent section that projects away from the plate 19 and is positioned within cavity 22 of piston 14.

The one-piece housing 11 also defines a pair of outboard bores 24 and 25 that are positioned on an opposite side of rotor opening 23 from the inboard bore 12. The centers of the outboard bores are spaced apart from one another by a distance that is greater than the diameter of the one inboard bore 12 resulting in an advantageously wide force distribution across the pad assembly 32. The bore 24 slidably carries a piston 26, and a fluid seal 28 is carried in a groove within the bore 24 engaging the piston 26 and maintaining fluid within fluid chamber 41 which is defined within the bore 24 and behind the piston 26. A wiper 29 is carried by the housing 11 at the opening to the bore 24 and engages the piston 26. Similarly, the bore 25 carries a piston 27, and a fluid seal 30 is carried in a groove of the housing 11 within the bore 25 and engages the piston 27 defining a fluid chamber 42 within the bore 25 and behind the piston 27. A wiper 31 is also carried by the housing 11 near the opening to the bore 25 and engages the piston 27.

The pistons 26 and 27 engage an outboard pad assembly 32 that includes a plate 33 with a lining 34 bonded thereto.

A wear sensor 35 is carried by the plate 33 and extends into the lining 34. The wear sensor 35 comprises a metal reed that contacts the brake rotor when the lining 34 has worn to a certain point creating vibrations and an audible sound indicative of a need to change the lining 34. Wear sensor 35 includes a bent section that is positioned within an access cavity 37 that is formed in housing 11. The access cavity 37 is positioned across the rotor opening 23 from the bore 12 and is substantially in line with the bore 12 so that during manufacturing of the housing 11 a rotating tooling shaft can be extended through the access cavity 37 for machining the interior of the bore 12. Similarly the housing 11 includes access cavities 38 and 39. The access cavity 38 is positioned across the rotor opening 23 from the bore 24 and is substantially aligned with the bore 24 so that a rotating tooling shaft can be extended through the access cavity 38 during a machining operation of the interior surface of housing 11 within the bore 24. The access cavity 39 is positioned substantially in line with the bore 25 so that a rotating tooling shaft can extend through the access cavity 39 as the surface of housing 11 within the bore 25 is machined.

Figure 2:
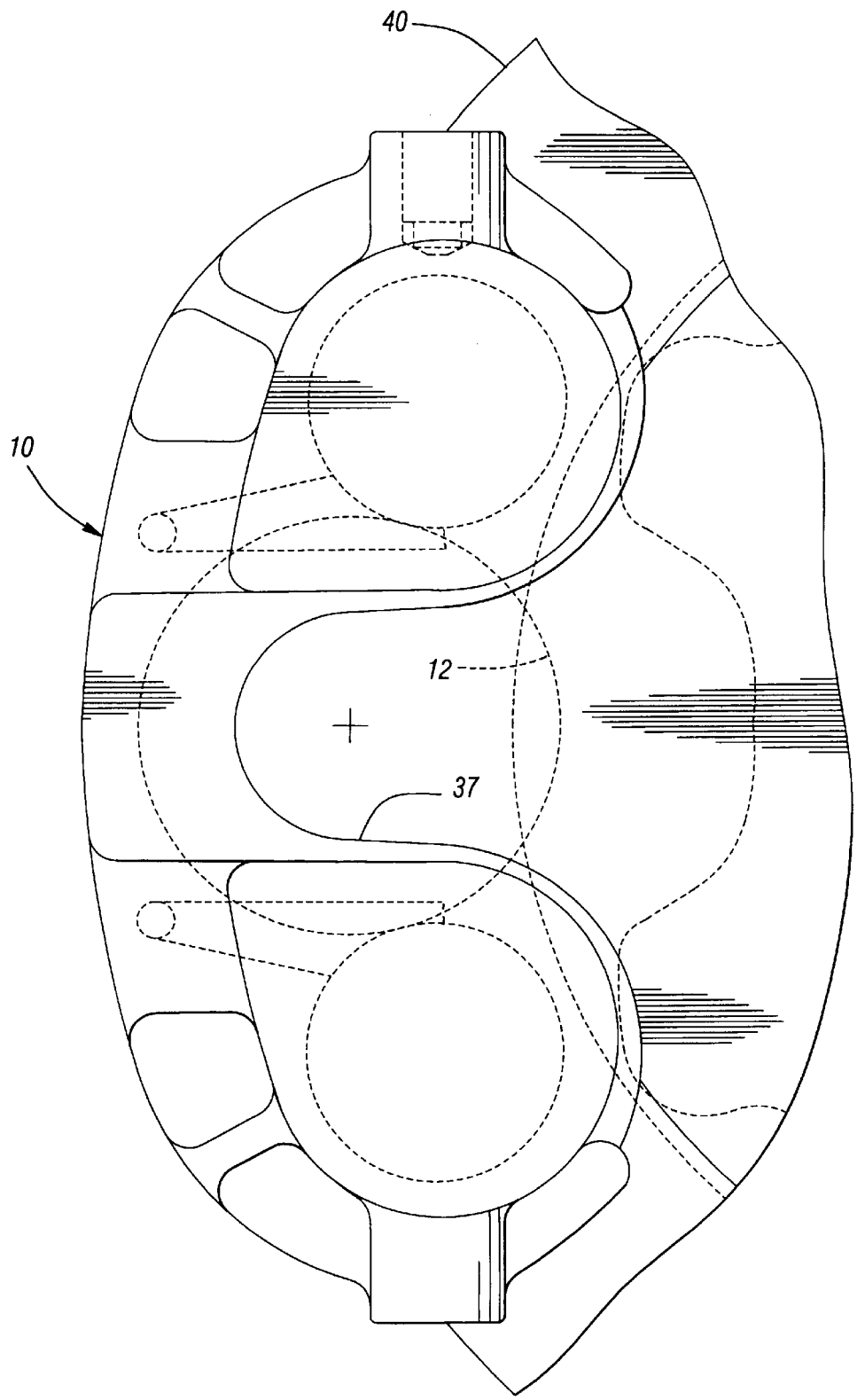
FIG. 2 is a partial perspective view of the brake caliper assembly of FIG. 1 shown on a brake rotor.
Figure 3:
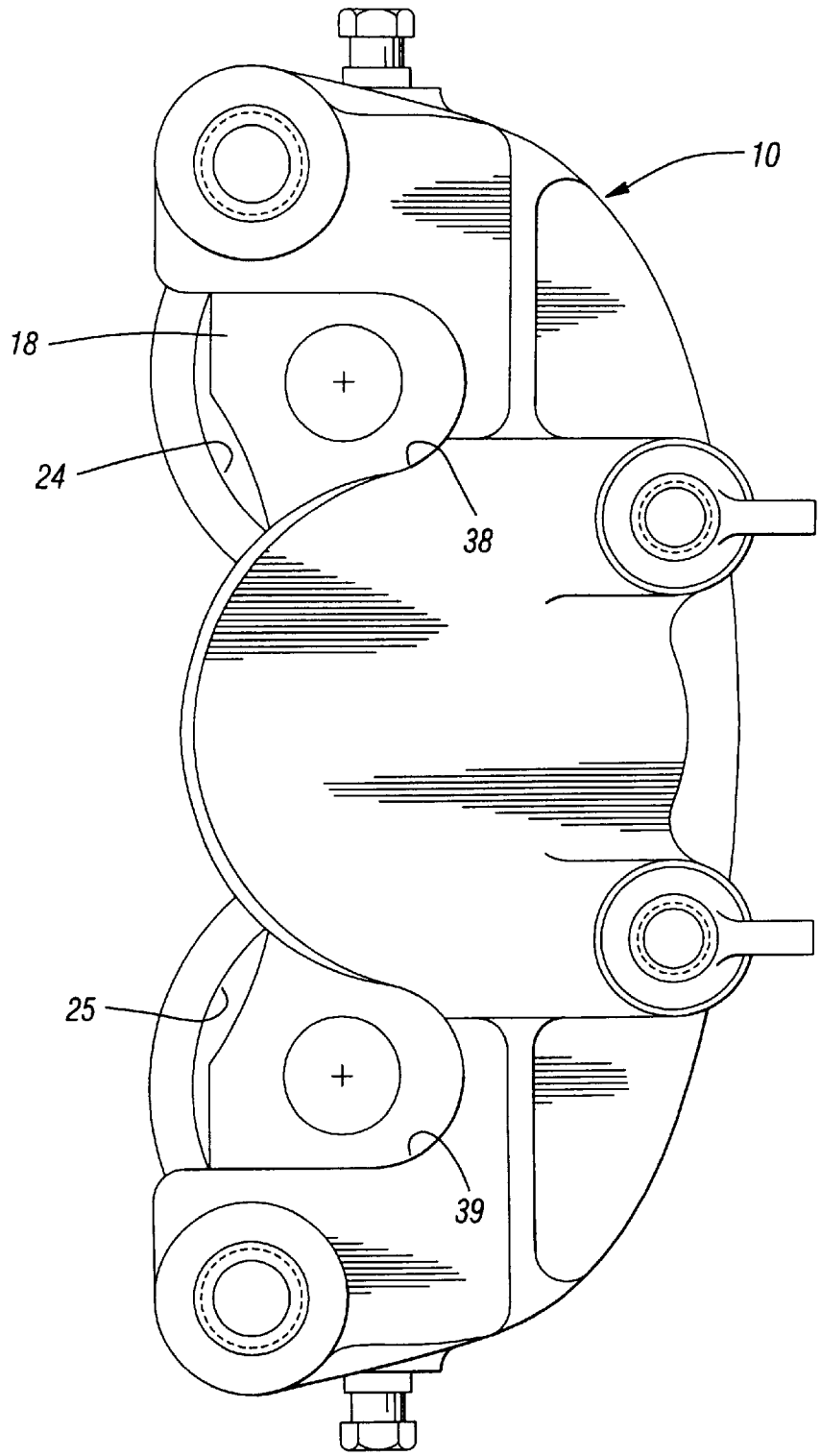
FIG. 3 is a partial perspective view of the brake caliper assembly of FIG. 1.

Referring to FIG. 2, it can be seen that the caliper assembly 10 is mounted in position over a brake rotor 40. The access cavity 37 is visible and is substantially centered with the bore 12, which is positioned on the opposite side of the rotor 40 from the access cavity 37 in the present view. Referring to FIG. 3, the caliper assembly 10 is shown from the inboard side with inboard pad assembly 18 positioned within the caliper assembly 10. The access cavity 38 is visible and is substantially centered in relation to the outboard bore 24 which is behind the inboard pad assembly 18 in the present view. Similarly it can be seen that the visible access cavity 39 is positioned in a substantially centered position relative to the outboard bore 25 which is positioned behind the pad assembly 18 in the present view.

Figure 4:
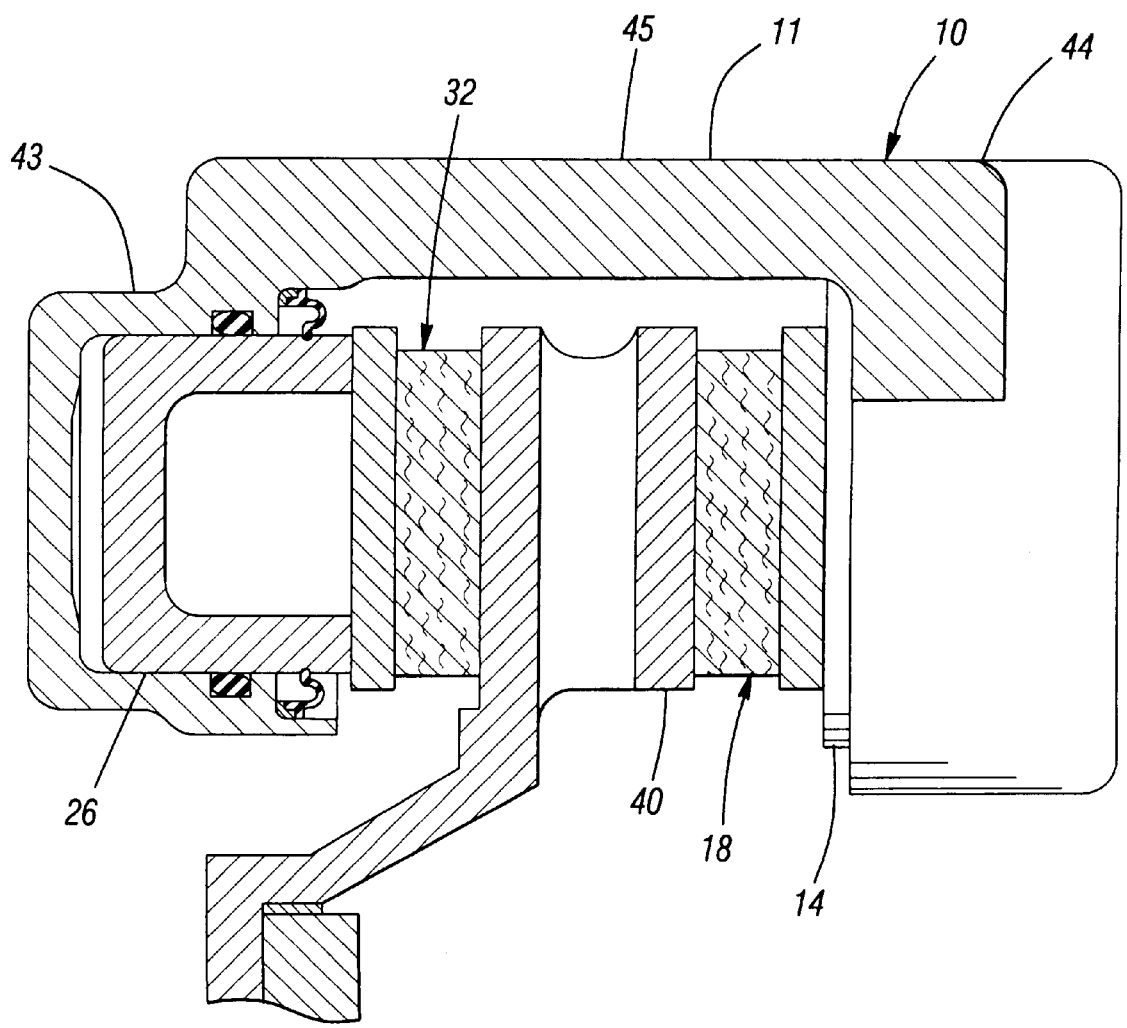
FIG. 4 is a schematic cross sectional illustration of the brake caliper assembly of FIG. 1.

Referring to FIG. 4, the caliper assembly 10 is shown from another position mounted relative to a brake rotor 40. The piston 14 engages the inboard pad assembly 18 and the piston 26 engages the outboard pad assembly 32. The pad assemblies 18 and 32 are clamped onto the rotor 40 under operation of the caliper assembly 10. It can be seen that the housing 11 is one piece as it spans across the rotor 40 containing the pad assemblies 18 and 32. The two reaction load carrying members 43 and 44 are connected together by the spanning member 45, with all three members formed as one cast piece so that compliance of the housing 11 during brake applications is minimized.

Referring again to FIG. 1, the housing 11 also has machined surfaces 46–49 that have the same radial center as the bores 24 and 25 so that they can be machined by the same tool during manufacturing. The surfaces 46–49 help define pockets in the reaction load carrying members 43 and 44 that contain the brake pad assemblies 32 and 18. Accordingly, the present invention provides a true one-piece housing fixed brake caliper.

I claim:

1. A disc brake caliper comprising:
   a housing having a first reaction load carrying member and a second reaction load carrying member joined to the first reaction load carrying member by a spanning member wherein the first reaction load carrying member, the second reaction load carrying member and the spanning member are formed as one piece, wherein the first reaction load carrying member includes a relatively large bore that opens toward the second reaction load carrying member, a first access cavity and a second access cavity wherein the first and the second access cavities are formed on opposite sides of the relatively large bore, wherein the second reaction load carrying member includes a first relatively small bore, a second relatively small bore, and a third access cavity, wherein the first access cavity is substantially aligned with the first relatively small bore so that a first longitudinal axis defined at the center of the first relatively small bore projects through the first access cavity, the second access cavity is aligned with the second relatively small bore so that a second longitudinal axis defined at the center of the second relatively small bore projects through the second access cavity, and the third access cavity is aligned with the relatively large bore so that a third longitudinal axis defined at the center of the relatively large bore projects through the third cavity.

2. A disc brake caliper according to claim 1 further comprising a brake shoe positioned near the first and the second relatively small bores wherein the first and the second relatively small bores are spaced apart by a distance that is greater than a diameter of the relatively large bore, and wherein the distance results in a wide force distribution across the shoe.

3. A disc brake caliper according to claim 1 further comprising a first wear sensor that projects into the third access cavity.

4. A disc brake caliper according to claim 3 further comprising a piston defining a cavity carried in the relatively larger bore, and a second wear sensor, wherein the second wear sensor projects into the cavity.

5. A disc brake caliper comprising:
   a housing having a first reaction load carrying member and a second reaction load carrying member joined to the first reaction load carrying member by a spanning member wherein the first reaction load carrying member, the second reaction load carrying member and the spanning member are formed as one piece, wherein the first reaction load carrying member includes a relatively large bore that opens toward the second reaction load carrying member, a first access cavity and a second access cavity wherein the first and the second access cavities are formed on opposite sides of the relatively large bore, wherein the second reaction load carrying member includes a first relatively small bore, a second relatively small bore, and a third access cavity, wherein the first relatively small bore defines a first area, the second relatively small bore defines a second area, and the relatively large bore defines a third area that is approximately equal to the sum of the first area and the second area, and wherein the first access cavity is substantially aligned with the first relatively small bore so that a first longitudinal axis defined at the center of the first relatively small bore projects through the first access cavity, the second access cavity is aligned with the second relatively small bore so that a second longitudinal axis defined at the center of the second relatively small bore projects through the second access cavity, and the third access cavity is aligned with the relatively large bore so that a third longitudinal axis defined at the center of the relatively large bore projects through the third cavity.

6. A disc brake caliper comprising:
   a housing having a first reaction load carrying member and a second reaction load carrying member joined to the first reaction load carrying member by a spanning member wherein the first reaction load carrying member, the second reaction load carrying member and the spanning member are formed as one piece, wherein the first reaction load carrying member includes a relatively large bore that opens toward the second reaction load carrying member, a first access cavity and a second access cavity wherein the first and the second access cavities are formed on opposite sides of the relatively large bore, wherein the second reaction load carrying member includes a first relatively small bore, a second relatively small bore, and a third access cavity, wherein the first relatively small bore defines a first area, the second relatively small bore defines a second area, and the relatively large bore defines a third area that is approximately equal to the sum of the first area and the second area, and wherein the first access cavity is substantially aligned with the first relatively small bore so that a first longitudinal axis defined at the center of the first relatively small bore projects through the first access cavity, the second access cavity is aligned with the second relatively small bore so that a second longitudinal axis defined at the center of the second relatively small bore projects through the second access cavity, and the third access cavity is aligned with the relatively large bore so that a third longitudinal axis defined at the center of the relatively large bore projects through the third cavity, wherein the first load carrying member has a first pocket that contains a first brake pad and the second load carrying member has a second pocket that contains a second brake pad wherein the first and the second pockets each have surfaces that have a first radius and wherein the first relatively small bore has a second radius and the second relatively small bore has a third radius and wherein the first, second and third radii are all equal.

* * * * *